United States Patent
Daoud

(10) Patent No.: US 9,374,772 B2
(45) Date of Patent: Jun. 21, 2016

(54) TELEMATICS SUPPORT FOR MOBILE WIRELESS NETWORK SERVICE SWAPPING

(71) Applicant: General Motors LLC, Detroit, MI (US)

(72) Inventor: Ayman R. Daoud, Novi, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 77 days.

(21) Appl. No.: 14/318,090

(22) Filed: Jun. 27, 2014

(65) Prior Publication Data

US 2015/0382286 A1 Dec. 31, 2015

(51) Int. Cl.
*H04W 4/00* (2009.01)
*H04W 48/16* (2009.01)

(52) U.S. Cl.
CPC ..................... *H04W 48/16* (2013.01)

(58) Field of Classification Search
CPC ....... H04W 48/18; H04W 4/02; H04W 8/082; H04W 8/10; H04W 48/16
USPC ......................... 455/41.2, 406, 434
See application file for complete search history.

(56) References Cited

U.S. PATENT DOCUMENTS

2015/0111529 A1* 4/2015 Johnson ................ H04M 15/60 455/406
2015/0126190 A1* 5/2015 Li .......................... H04W 8/205 455/436

* cited by examiner

*Primary Examiner* — Amancio Gonzalez
(74) *Attorney, Agent, or Firm* — Leydig, Voit & Mayer, Ltd.

(57) ABSTRACT

A method for implementation at a processor of a vehicular telematics unit is described. The method allows data structures formatted to store one or more wireless network communication parameters to be updated in response to a swap of a subscription with one network service provider for a subscription with a different network service provider. The method includes receiving, from a network access device of the vehicular telematics unit, a home public land mobile network (HPLMN) identifier corresponding to a wireless network service provider corresponding to an active subscription. The method also includes identifying, in a set of one or more access point name (APN) data structures each having a public land mobile network (PLMN) identifier field, a matching APN data structure having the HPLMN identifier stored at its PLMN element and designating the matching APN data structure as active.

20 Claims, 5 Drawing Sheets

| HPLMN Identifier |||||||
| --- | --- | --- | --- | --- | --- | --- |
| PD Traffic | APN Name | User Name | Password | Renewal Rate | Dial String | Non APN |
| On* 1 call flow | | | | | | |
| On* 2 call flow | | | | | | |
| IHU | | | | | | |
| WIFI | | | | | | |
| On* Non call flow | | | | | | |

FIG. 4

TELEMATICS SUPPORT FOR MOBILE WIRELESS NETWORK SERVICE SWAPPING

TECHNOLOGY FIELD

The present disclosure relates generally to telematics systems and more particularly to connectivity between telematics service providers and the telematics units through which services are provided.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global positioning system (GPS) aided navigation, map services, and turn-by-turn navigation assistance. Telematics units are often provisioned and activated at a point of sale when a subscriber purchases a telematics-equipped vehicle. Upon activation, the telematics unit can be utilized to provide a subscriber with a variety of telematics services.

The process of provisioning and activating a telematics unit involves the acquisition and registration by the telematics service provider of unique identifiers associated with a particular telematics unit that are stored on a chip or memory card integrated with the particular telematics unit. Furthermore, the provisioning and activating processes involves initiating and verifying a subscription with a mobile wireless network service provider. The subscription with the mobile wireless network service provider enables the TSP to communicate with the telematics unit and thereby provide telematics services. Methods for maintaining correct identifiers for subscriber devices and for the mobile wireless network services through which TSPs communicate with subscriber devices ensure that telematics services may be efficiently and effectively provided by TSPs to subscribers when they are requested.

SUMMARY OF THE INVENTION

A method, implemented at a processor of a vehicular telematics unit, for updating data structures formatted to store one or more wireless network communication parameters is provided, the method comprising receiving, from a network access device (NAD) of the vehicular telematics unit, a home public land mobile network (HPLMN) identifier corresponding to a first mobile wireless network service provider (MWNSP), identifying, in a set of one or more access point name (APN) data structures each having a public land mobile network (PLMN) identifier element, a matching APN data structure having the HPLMN identifier stored at its PLMN element, and designating the matching APN data structure as active.

A processor of a vehicular telematics unit configured to update data structures formatted to store one or more wireless network communication parameters is provided herein, the processor comprising a receiving engine configured to receive a home public land mobile network (HPLMN) identifier corresponding to a first mobile wireless network service provider (MWNSP) from a network access device (NAD) of the vehicular telematics unit, a search engine, configured to identify a matching access point name (APN) data structure having the HPLMN identifier stored at a PLMN identifier element from a set of one or more access point name (APN) data structures each having a PLMN identifier element, and a selection engine, configured to select the matching APN data structure as an active APN data structure.

A method, implemented at a service provider server, for facilitating updating of data structures stored at a non-transitory computer readable medium of a vehicular telematics unit and formatted to store one or more wireless network communication parameters is provided, the method comprising transmitting, to the vehicular telematics unit: a target public land mobile network (PLMN) identifier and a request to verify that an access point name (APN) data structure having a PLMN identifier element storing the target PLMN identifier is stored at a non-transitory computer readable medium of the vehicular telematics unit, a request to deactivate a subscription with a first mobile wireless network service provider (MWNSP) and activate a subscription with a target MWNSP, and a request to confirm that an over-the-air (OTA) subscription swap has been completed and to provide a home PLMN (HPLMN) identifier of an APN data structure designated as active after completion of the subscription swap, wherein the request to deactivate a subscription with the first MWNSP and activate a subscription with a target MWNSP includes a request to perform the OTA subscription swap.

BRIEF DESCRIPTION OF THE DRAWINGS

While the appended claims set forth the features of the present disclosure with particularity, the invention, together with its objects and advantages, may be best understood from the following detailed description taken in conjunction with the accompanying drawings of which:

FIG. 4 is a schematic diagram of an access point name table corresponding to a mobile wireless network service provider subscription;

DETAILED DESCRIPTION

Before discussing the details of the invention and the environment wherein the invention may be used, a brief overview is given to guide the reader. In general terms, systems and methods are described herein for maintaining connectivity between telematics service providers (TSPs) and subscriber devices, such as vehicle telematics units, when a subscription with a mobile wireless network service provider (MWNSP) that maintains a mobile wireless network across which voice and data packets can be transmitted between the TSP and the subscriber devices is swapped for a subscription with an alternative MWNSP. It will be appreciated that the principles described herein are applicable to apparatuses capable of sending information to, receiving information from, or both sending information to and receiving information from a telematics service provider (TSP), e.g. vehicular telematics units, smart phones, tablet computers, laptop computers, etc.

Figure 1:
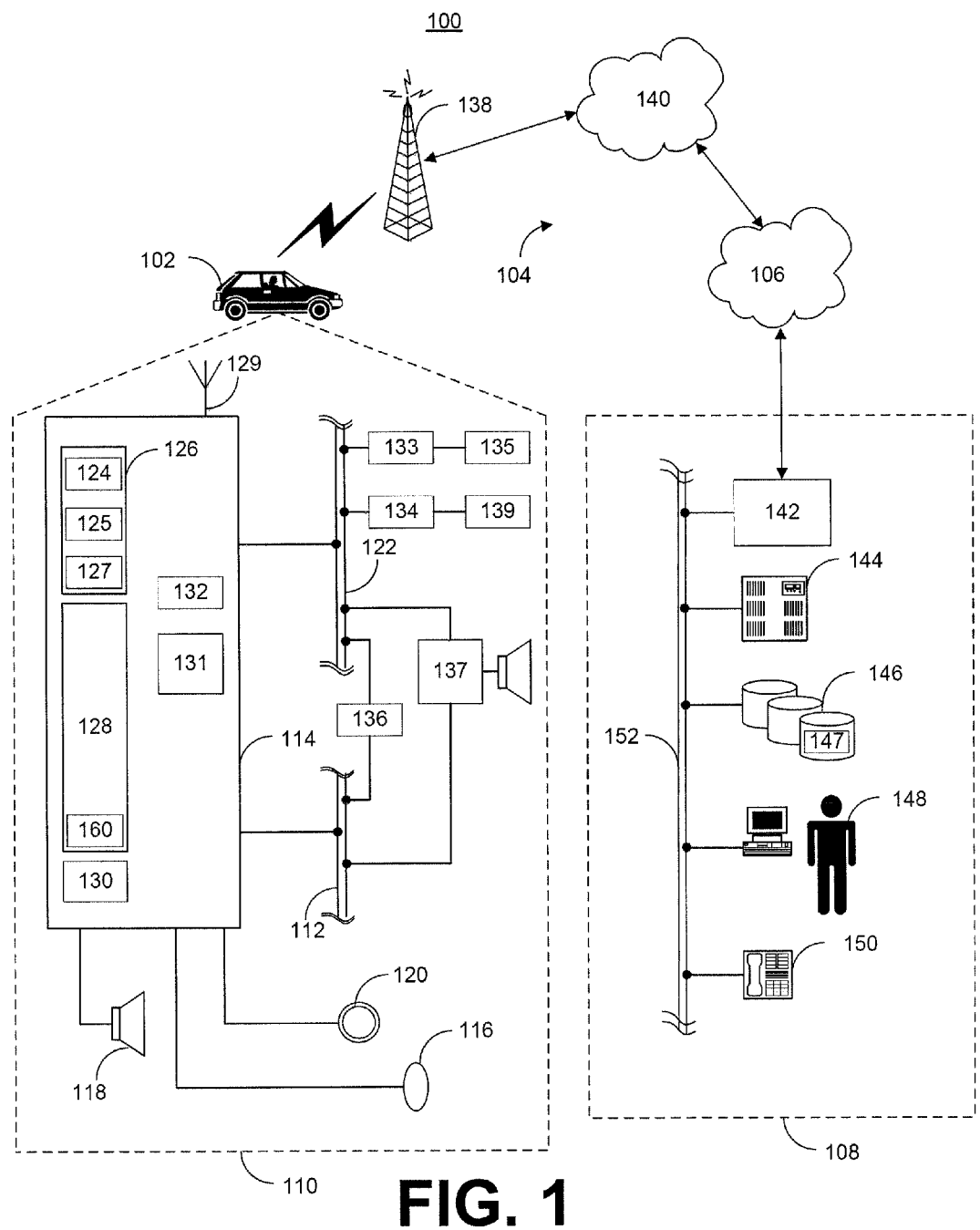
FIG. 1 is a schematic diagram of an operating environment for a mobile vehicle communication system usable in implementations of the described principles.

In general, the illustrative examples described herein pertain to facilitating the provisioning of network identifiers in various devices used by subscribers to receive telematics services from a TSP. An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108 associated with a particular TSP. It should be appreciated that the overall architecture, setup and operation, as well as the individual components of the communication system 100 is generally known in the art. However, other systems are contemplated that are capable of incorporating the described database and processor functionality described herein.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the communications center 108, and generally includes an electronic processing system 128, one or more types of electronic memory 130, a cellular chipset/component 124, a wireless modem 125, a universal integrated circuit card 127, a dual antenna 129 and a navigation unit containing a GPS chipset/component 132. The electronic processing system 128 includes a host processor 160. The GPS chipset/component is capable of determining the location of the vehicle with a high degree of accuracy. In one example, the wireless modem 125 comprises, and is carried out in the form of, a computer program and/or set of software routines executing within the electronic processing system 128.

The cellular chipset/component 124 and the wireless modem 125 may be called the network access device (NAD) 126 of the telematics unit 114. In some implementations, the NAD 126 of the telematics unit 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol. A UICC 127 can store a variety of identifiers and parameters necessary to enable the telematics unit 114 to communicate through wireless carrier system 104. The UICC 127 can store an integrated circuit card identifier (ICCID) corresponding to the UICC 127, an international mobile subscriber identity (IMSI) associated with the UICC 127, a mobile station international subscriber directory number (MSISDN), and other identifiers assigned by one or more MWNSPs or related to subscriptions with one or more MWNSPs.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a communications center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 125 for data transmission. For example, data pertaining to a forecast of a utility's renewable energy mixture can be transmitted to the telematics unit 114 via the wireless modem 125.

To enable successful data transmission over the communications channel, wireless modem 125 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the communications center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained. Vehicle sensors 139, connected to various sensor interface modules 134 are operatively connected to the vehicle bus 122. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to communications center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The communications center 108 is designed to provide the vehicle hardware 110 with a number of different system backend functions and, according to the example shown here, generally includes one or more switches 142, servers 144, databases 146, live advisors 148, and a variety of other telecommunication and computer equipment 150 that is known to those skilled in the art. These various communications center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected, via the network connection or bus 152, to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned communications center, it will be appreciated that the communications center 108 can be any central or remote facility, manned or unmanned, mobile or fixed, to or from which it is desirable to exchange voice and data.

A portion 147 of the databases 146 stores information pertaining to an identity of the telematics unit 114. For example, the portion 147 of the databases 146 may store, for the vehicle 102, an integrated circuit card identifier (ICCID) corresponding to the universal integrated circuit card (UICC) of the telematics unit 114, an international mobile equipment identity (IMEI) corresponding to network access devices (NADs) integrated into the telematics unit 114, a mobile identification number (MIN), an electronic serial numbers (ESN), a mobile equipment identifier (MEID), an international mobile subscriber identity (IMSI) associated with the UICCs of the vehicle's telematics unit, a mobile device number (MDN), a mobile station international subscriber directory number (MSISDN), a service set identifier (SSID), a media access control (MAC) address, and an internet protocol (IP) address associated with the vehicle's telematics unit. Additional information pertaining to a subscriber affiliated with a particular telematics unit 114 may also be stored in the portion 147 of the databases 146. For example, billing information associated with the subscriber may be stored in the portion 147. The preceding examples of information that can be stored within the portion 147 of the databases 146 is not exhaustive, and additional types of data may also be stored within the portion 147.

The servers 144 interface with mobile wireless network service providers (MWNSPs), databases 146, and telematics units such as the telematics unit 114. The servers 144 have processors that can be configured to request and receive information from telematics units such as the telematics unit 114. In some implementations, information requested and received by the servers 144 is subsequently stored in the databases 146. Furthermore, the servers 144 through a mobile wireless carrier system, such as e.g., mobile wireless carrier system 104, or through a combination of a land network and a mobile wireless carrier system. The servers 144 may request information from MWNSPs, receive information from MWNSPs, and store information received from MWNSPs. In some implementations, the information received from MWNSPs is stored at databases 146.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the communications center may be carried out according to stored instructions or applications installed at the communications center.

The present disclosure provides systems and methods for performing an over-the-air (OTA) swap a subscription with one mobile wireless network service provider (MWNSP) for a subscription with another MWNSP thereby enabling a telematics unit to begin communicating through a different mobile wireless network. The present disclosure contemplates enabling a host processor of a telematics unit to adapt to a subscription swap executed at a universal integrated circuit card (UICC) of the telematics unit. The subscription swap can be implemented through the capabilities of an applet, known as a subscription management module (SMM), to deactivate a subscription with a first MWNSP and activate a subscription with a second MWNSP.

In the event that a telematics unit deactivates a subscription with one MWNSP and activates a subscription with a different MWNSP for communication with the TSP, the telematics unit will be unable to initiate communications without utilizing identifiers corresponding to the network services provided by the MWNSP with which a subscription is active. Similarly, in the event that the TSP attempts to push information to the telematics unit, the TSP must use the wireless network communication parameters that correspond to the MWNSP with which the subscription is active. The systems and methods of the present disclosure provide for allowing a telematics unit to update a set of active wireless network communication parameters to reflect a subscription swap.

Implementations described herein contemplate swapping a subscription with a first MWNSP for a subscription with a second MWNSP and activating the subscription with the second MWNSP at the SMM of the UICC 127 of the telematics unit. During a process for updating network interface parameters to account for a mobile wireless network service provider subscription swap implemented by the host processor 160, the host processor 160 may populate fields of a data structure with wireless network communication parameters corresponding to a swapped-in, or target, MWNSP subscription. In various implementations, the host processor 160 can obtain the wireless network communication parameters corresponding to the MWNSP subscription from the UICC 127, from an OTA server operated by a vendor or manufacturer of the UICC 127, from one of the servers 144, and from onboard memory located at the telematics unit 114. Various implementations contemplate that the host processor 160 obtains the wireless network communication parameters individually or that the host processor 160 obtains a data structure storing a complete or partial set of the wireless network communication parameters corresponding to the swapped-in MWNSP subscription.

The host processor 160 can also modify the designation of data structures capable of storing wireless network communication parameters during the process for updating network interface parameters to account for a subscription swap. For example, a set of data structures that each store wireless network communication parameters for a subscription with a MWNSP may be stored in a local memory of the telematics unit 114, and the host processor 160 may modify the designations of such data structures from "active" to "inactive" and vice versa in response to the execution of a subscription swap.

Implementations contemplate that the data structures capable of storing wireless network communication parameters corresponding to a subscription with a MWNSP are access point name (APN) tables. APN tables are data structures specifically formatted for storing network interface parameters. Network interface parameters can include, for example, gateway names, network identifiers such as packet data network (PDN) identifiers, network operator identifiers, subscriber-network interface parameters, and service type identifiers. APN tables can also store relationships between network interface parameters and other information. For example, APN tables can map particular services and service types to particular network gateways.

A telematics unit 114 may store a plurality of APN table data structures at an onboard memory, such as the memory 130. The APN table data structures stored at the onboard memory can be indexed by a public land mobile network (PLMN) corresponding to the MWNSP. The host processor 160 can monitor the creation of new APN table data structures in order to prevent the creation of multiple APN tables with the same unique PLMN identifier. In this manner, the host processor 160 can ensure that each APN tables stored at the local memory of the telematics unit 114 corresponds to a unique wireless network.

In some implementations, the TSP initiates the swap of the first MWNSP subscription for the second MWNSP subscription. In alternative implementations, a subscriber may initiate the swap of the first MWNSP subscription for the second MWNSP subscription. For example, if a TSP permits individual subscribers to select a MWNSP from a list of pre-approved MWNSPs, an individual subscriber may elect to swap one service provider for another and initiate such a swap via a telematics unit, such as the telematics unit 114. In implementations where the swap is initiated by a telematics unit, the telematics unit may transmit a request to the TSP to swap a first MWNSP subscription for a second MWNSP subscription. The TSP may maintain data pertaining to the MWNSP utilized by one or more subscribers at the portion 147 of the databases 146. In such implementations, after the request is received, the TSP may link an APN table data structure corresponding to a MWNSP with the requesting telematics unit or with a user account affiliated with the requesting telematics unit. In various implementations, APN table data structures may be stored within a data structure stored at the portion 147 of the databases 146, such as a user account data structure or a telematics unit data structure. In further implementations, the APN tables are independent data structures not nested in any data structure corresponding to a subscriber account or telematics unit, and data structures for subscriber accounts or telematics units stored at the databases 146 point to the independent APN table data structures.

The subscription swap can be executed via an OTA server operated by, e.g., a vendor of the UICC 127, an affiliate of the vendor, or the TSP. The triggering of the subscription swap may comprise the TSP transmitting a message to an OTA server operated by a vendor of the UICC 127, or alternatively may comprise the telematics unit 114 or the MWNSP transmitting a message to the OTA server. In various implementations, the subscription swap can be triggered by a message originating at the UICC 127 and addressed to the OTA server or by a message originating at the OTA server and addressed to the UICC 127. During the process of swapping MWNSP subscriptions, the OTA server and the UICC 127 exchange a variety of data through the telematics unit 114. The data can include but is not limited to network interface parameters, for example gateway names, network identifiers, network operator identifiers, and subscriber-network interface parameters. Alternatively, if data pertaining to a subscription with the second MWNSP already stored at the UICC 127, the OTA server may not transmit the network interface parameters preloaded on the SMM.

Systems and methods of the present disclosure further contemplate that the NAD 126 of the telematics unit 114 will reset after the subscription swap has been completed. After the reset, the NAD 126 is able to sync with the new MWNSP. The reset of the NAD 126 can trigger the transmission of a message to the host processor 160 of the telematics unit 114 that includes an identifier for a home public land mobile network (HPLMN) associated with the new MWNSP. Alternatively, the host processor can detect that the NAD has completed a reset and query the NAD 126 or the UICC 127 for an HPLMN identifier in response thereto. After the host processor 160 receives the HPLMN associated with the MWNSP with which the UICC 127 has a newly activated subscription with, the host processor 160 identifies an APN table that has an HPLMN field value that corresponds to the HPLMN identifier received from the NAD 126 or the UICC 127. The host processor 160 thereafter designates the identified APN table as the active APN table for the telematics unit 114. Some implementations further contemplate that the telematics unit 114 provides the TSP with data pertaining to the newly activated MWNSP subscription. For example, the host processor 160 may transmit the HPLMN identifier and other network communication parameters to the communications center 108 of the TSP.

Figure 2:
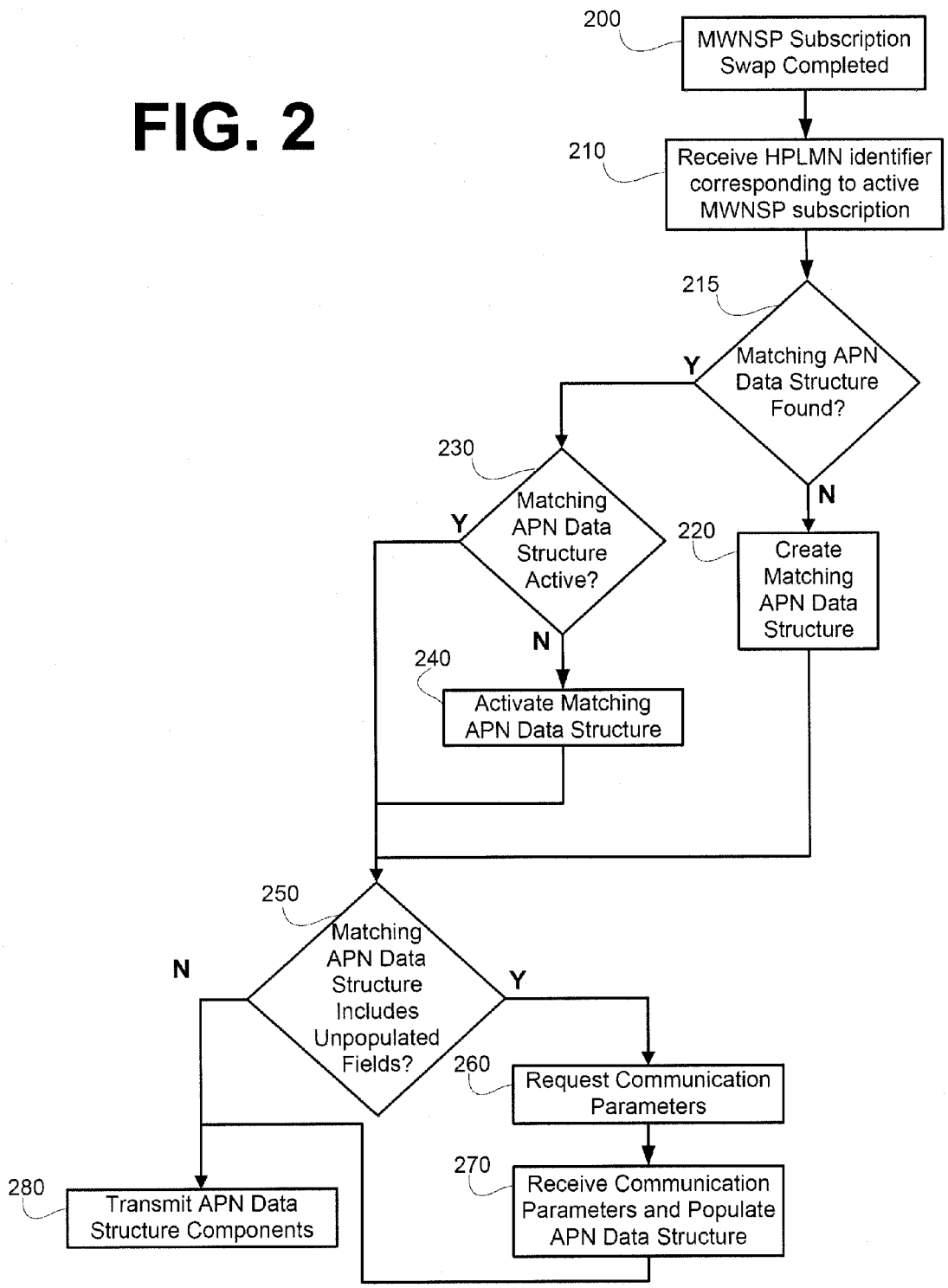
FIG. 2 is a flowchart illustrating a process implemented by a host processor of a telematics unit for updating wireless network communication parameters to account for a mobile wireless network service provider subscription swap.

FIG. 2 is a flowchart illustrating a process implemented by a host processor of a telematics unit for updating network interface parameters to account for a mobile wireless network service provider (MWNSP) subscription swap. At step 200, a MWNSP subscription swap is completed. The completion of the MWNSP subscription swap can trigger a reset procedure at the NAD 126.

At step 210, the host processor 160 receives a home public land mobile network (HPLMN) identifier corresponding to a public land mobile network (PLMN) of a MWNSP with which an active subscription is maintained at the UICC 127. The MWNSP with which an active subscription is maintained at the UICC 127 is a target MWNSP, i.e. a MWNSP corresponding to a subscription that was activated during the subscription swap procedure.

At step 215, the host processor 160 determines whether an access point name (APN) data structure having a PLMN field populated with the HPLMN identifier received at step 210 is located at a local memory of the telematics unit 114, e.g. memory 130. An APN data structure whose PLMN field is populated with the HPLMN identifier received at step 210 can be referred to as a matching APN data structure. If no matching APN data structure is identified at step 215, the process proceeds to step 220. If a matching APN data structure is identified at step 215, the process proceeds to step 230.

At step 220, the process creates a new APN data structure, populates a PLMN field of the new APN data structure with the HPLMN received at 210, and designates the new APN data structure as active. Thereafter the process proceeds to step 250.

At step 230, the process determines whether the matching APN data structure is designated as active. If the matching APN data structure is not designated as active, the process proceeds to step 240, where the designation of the matching APN data structure is updated. Updating the designation of the matching APN data structure can, include designating the matching APN data structure as the home network APN data structure. If instead the matching APN data structure is designated as active (or as the home network APN data structure), the process proceeds to step 250.

At step 250, the host processor 160 determines whether the active APN data structure includes unpopulated fields. In some implementations, the host processor 160 also determines if the unpopulated fields are required to be populated to enable certain communication services. For example, the host processor may determine whether relationships between service types and network interfaces are stored at the APN data structure. The host processor 160 can also categorize data structure fields and service-network interface relationships. The host processor 160 can determine the category to which unpopulated fields and relationships not stored in the APN data structure belong. Some implementations contemplate that the categorization can be determined according to the identity of the MWNSP with which an active subscription is maintained. For example, the host processor 160 may use the HPLMN as an input in the categorization determination procedure.

At step 260, the host processor requests network communication parameters corresponding to unpopulated fields of the active APN data structure and relationship information for service-network interface relationships not stored in the active APN data structure. The host processor 160 may request such values from the UICC 127, the OTA server, or the communication center 108. In some implementations, the host processor 160 may only request field values and relationship information for certain categories of data structures and service-network interface relationship. In other implementations, the host processor 160 may utilize the categories of data structures and service-network interface relationships to determine which entity to which the requests for data structure field values and relationship information are transmitted. At step 270, the host processor 160 receives the requested network communication parameters and populates the unpopulated fields of the active APN data structure.

At optional step 280, the telematics unit 114 transmits, via the NAD 126, the active APN data structure or component data stored therein to the communications center 108 of the TSP. In response to receiving the data transmitted by the NAD 126 at step 270, the TSP may update information stored at the databases 146 in order to ensure that correct information pertaining to the telematics unit 114 is maintained.

In alternative implementations, the host processor 160 can receive a PLMN identifier from the communications center 108 prior to the initiation of a subscription swap, e.g. via a query from the TSP. If the host processor identifies an APN data structure matching the PLMN identifier, the TSP can transmit an additional query to determine if wireless network communication parameters with which the APN data structure fields are populated are accurate and to determine if any APN data structure fields are not populated. In that manner, the TSP can determine whether wireless network communication parameters necessary for communication via the services provided by target MWNSP are preloaded at the telematics unit 114 and transmit an updated APN data structure or transmit instructions to update certain fields of the APN data structure.

Additional alternative implementations contemplate that the host processor 160 can receive the PLMN identifier from an OTA server configured to facilitate a MWNSP subscription swap at the UICC 127 after the subscription swap has been initiated but prior to its completion. If the host processor 160 identifies an APN data structure matching the PLMN identifier, the OTA server can transmit an additional query to deter mine if wireless network communication parameters with which the APN data structure fields are populated are accurate and to determine if any APN data structure fields are not populated. In that manner, the OTA server can determine whether wireless network communication parameters necessary for communication via the services provided by target MWNSP are preloaded at the telematics unit 114 and transmit an updated APN data structure or transmit instructions to update certain fields of the APN data structure with certain network communication parameters. In that manner the OTA server can guide the subscription swap procedure and additionally provide a verification mechanism for the subscription swap. For example, the OTA server can require that network communication parameters populating fields of an APN data structure stored at the memory 130 of the telematics unit 114 match network communication parameters stored at the UICC 127.

Figure 3:
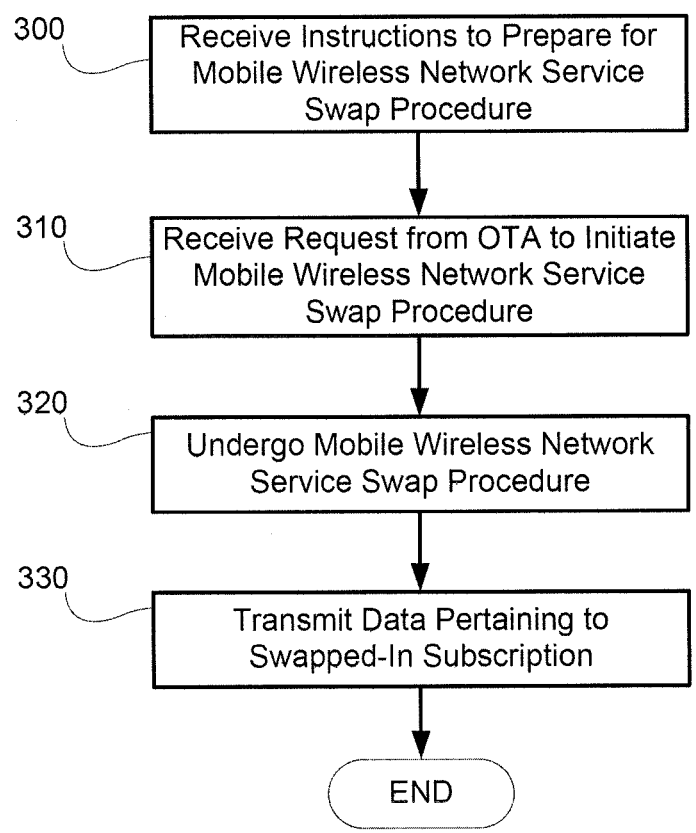
FIG. 3 is a flowchart illustrating a process implemented by a telematics service provider to facilitate a mobile wireless network service provider subscription swap and a corresponding wireless network communication parameter update.

FIG. 3 is a flowchart illustrating a process implemented by a telematics service provider to facilitate a mobile wireless network service provider subscription swap and a corresponding wireless network communication parameter update. At step 300, the TSP transmits instructions to the telematics unit 114 to prepare for a swap of a subscription with a first MWNSP for a subscription with a second MWNSP. The instructions transmitted at step 300 may be accompanied by information pertaining to the second MWNSP. For example, the TSP may transmit a PLMN identifier corresponding to the second MWNSP at step 300. At step 300, the TSP may also transmit an APN data structure corresponding to the second MWNSP to the telematics unit 114. In some implementations, the instruction transmitted at step 300 may be responsive to a request previously sent by the telematics unit 114 to the TSP to enable a subscription swap.

At step 310, the TSP initiates the subscription swap. Initiating the subscription swap can involve the transmission a request to perform a subscription swap from one of the servers 144 at the communication center 108 to an OTA server configured to perform a MWNSP subscription swap. In some implementations one of the servers 144 at the communication center 108 is an OTA server configured to perform a MWNSP subscription swap. The transmission to the OTA server including the request to perform the subscription swap may further include a request for the OTA server to transmit a swap confirmation message confirming that the subscription swap has been executed. The request for a swap confirmation may specify certain types of information to be included in the swap confirmation. For example, the request for the swap confirmation may specify that the swap confirmation specify one or more wireless network communication parameters corresponding to the subscription with the target MWNSP.

At step 320, the TSP receives a confirmation from the telematics unit 114 that the subscription swap has been successfully completed. The confirmation received by the TSP may be accompanied by a variety of information pertaining to the telematics unit 114 and to the newly active subscription with the swapped-in MWNSP. In some implementations, the TSP also receives a swap confirmation message from the OTA server at 320. In such implementations, the TSP may verify that the swap was successful, and if not, cause the process to return to step 310.

At step 330, the TSP updates the databases 146 to reflect updated MWNSP subscription information pertaining to the telematics unit 114. At step 330, the TSP may update a database entry corresponding to the telematics unit 114 or update a database entry corresponding to a subscriber affiliated with the telematics unit 114 or a subscriber account affiliated with the telematics unit 114. The database entries updated at step 330 may be located at the portion 147 of the databases 146. At step 330, the TSP may link an APN table data structure corresponding to the second MWNSP with the telematics unit 114 or with a user account affiliated with the telematics unit 114. In various implementations, the APN table data structure may be stored within a user account data structure or within a telematics unit data structure or may be an independent data structure.

FIG. 4 is a schematic diagram of an access point name (APN) data structure corresponding to a mobile wireless network service provider (MWNSP) subscription. The APN data structure in FIG. 4 provides information pertaining to the gateways through which data packet connections to and from the telematics unit 114 are established. The APN data structure depicted in FIG. 4 may be stored at the databases 146 as elements of a telematics unit data structure, which may in turn be elements of a subscriber data structure or a user account data structure. In other implementations, the APN data structures stored at the databases 146 are independent from but referenced by, or pointed to by, subscriber, user account, or telematics unit data structures. In some implementations, the APN data structures stored at the databases 146 may be identified and/or indexed by values of public land mobile network (PLMN) fields. With respect to APN data structures stored at the telematics unit 114, the host processor 160 may enforce rules that ensure that only a single APN data structure is active at any particular point in time. Furthermore, the host processor 160 may enforce rules that ensure that no two APN data structures maintained at the telematics unit 114 may have identical values populating their PLMN fields. In the APN data structure depicted in FIG. 4, each row corresponds to information pertaining to a data packet channel. Each row in the table depicted in FIG. 4 contains fields for an APN, for a user name, for a password, for a renewal rate, for a dial string, and for a non-APN. The APN data structure depicted in FIG. 4 is merely an example, and the data fields contained therein are by no means exhaustive. A variety of additional data fields may be included in APN data structures of alternative implementations of the invention.

Figure 5:
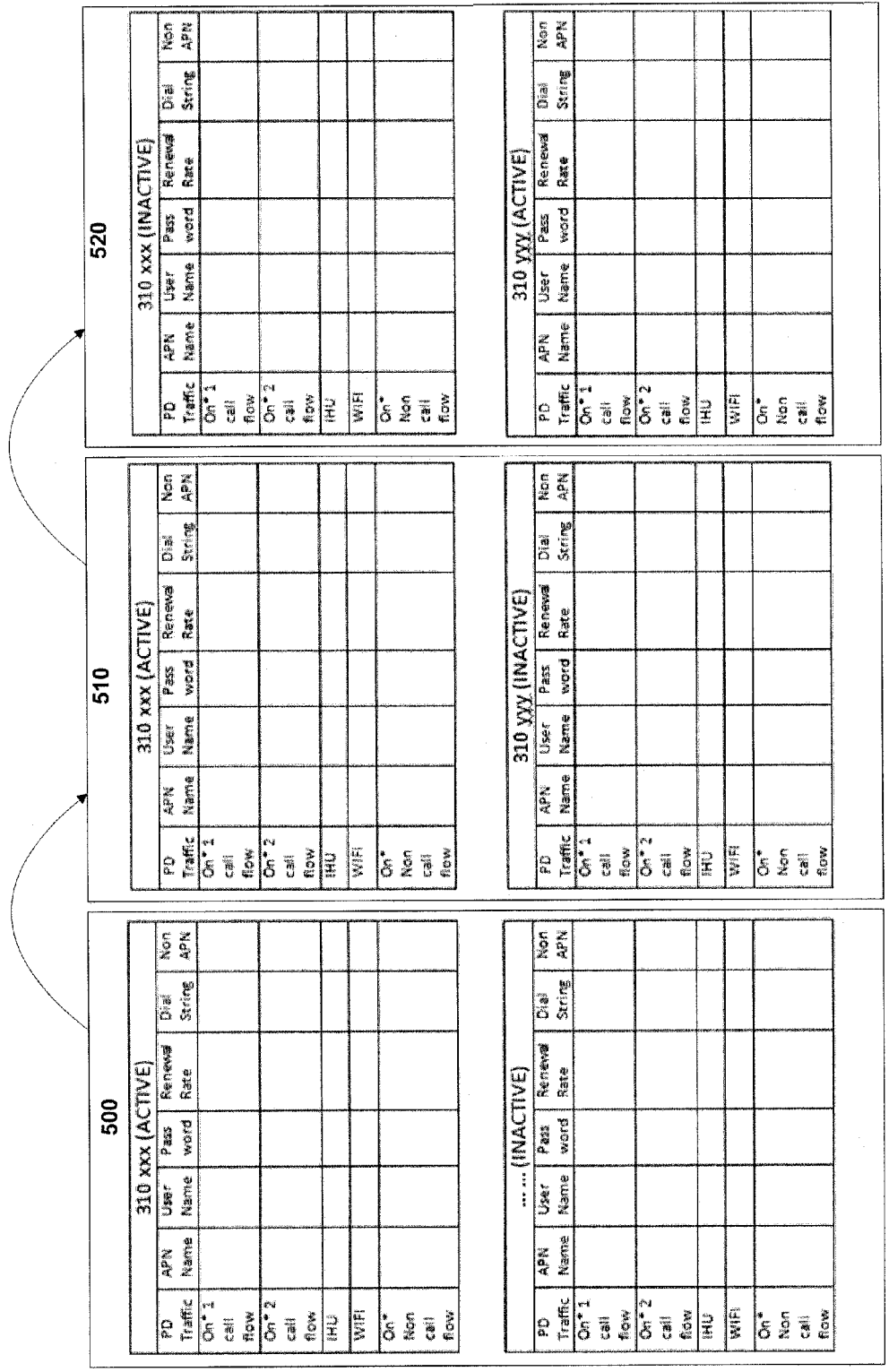
FIG. 5 is a schematic diagram depicting access point name tables corresponding to mobile wireless network service provider subscriptions during various stages of a process for updating wireless network communication parameters to account for a mobile wireless network service provider subscription swap.

FIG. 5 is a schematic diagram depicting access point name (APN) data structures corresponding to mobile wireless network service provider (MWNSP) subscriptions and maintained at a memory of a telematics unit, such as memory 130, during various stages of a process for updating network communication parameters to account for a MWNSP subscription swap. At stage 500, two APN data structures are depicted. The APN data structures are indexed and identified by the values of their public mobile land network (PLMN) fields. The APN data structures at 500 are representative of APN data structures in a process to swap a subscription with a first MWNSP for a subscription with a second MWNSP wherein the host processor 160 of the telematics unit has not yet received an identifier for the current HPLMN that matches the PLMN identifier corresponding to the second MWNSP. As depicted at stage 500, the APN data structure designated as "ACTIVE" has a PLMN identifier of 310*xxx*, while the APN data structure designated as "INACTIVE" has not yet been populated with a PLMN identifier.

At 510, the two APN data structures of 500 are depicted. The APN data structures at stage 510 are representative of APN data structures in a process to swap a subscription with a first MWNSP for a subscription with a second MWNSP wherein the host processor 160 has received an identifier for a current HPLMN that matches the PLMN identifier corresponding to the second MWNSP along with data pertaining to the remaining fields of the APN data structure corresponding to the second MWNSP. However, the APN structures at 510 are representative of a step where the host processor 160 has not yet verified whether the APN data structure designated as active has a PLMN identifier corresponding to the received HPLMN value. At 510, the APN data structure designated as "ACTIVE" has a PLMN identifier of 310xxx, while the APN data structure designated as "INACTIVE" has been populated with the PLMN identifier 310yyy.

At 520, the two APN data structures of 500 and 510 are again depicted. The APN data structures at 520 are representative of APN data structures in a process to swap a subscription with a first MWNSP for a subscription with a second MWNSP wherein the swap has occurred and the host processor 160 has identified the APN data structure with a PLMN identifier that corresponds to the HPLMN of the swapped-in network. At 520, the host processor has updated the APN data structure identified by PLMN identifier 310xxx as "INACTIVE" and updated the APN data structure designated by PLMN identifier 310yyy as "ACTIVE." The APN data structures depicted in FIG. 5 are merely examples, and the data fields contained therein are by no means exhaustive. A variety of additional data fields may be included in APN data structures of alternative implementations of the invention.

It will thus be appreciated that the described system and method allow for reliable verification of mobile station identifiers stored at multiple locations. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented at a processor of a vehicular telematics unit, for updating data structures formatted to store one or more wireless network communication parameters, the method comprising:
    maintaining, by the vehicular telematics unit, a set of access point name (APN) data structures, where each one of the set of APN data structures includes a public land mobile network (PLMN) identifier element and a set of rows, each row providing a set of network interface parameter values for a distinct communications channel, and wherein designating one of the set of APN data structures as an active APN data structure causes the telematics unit to reference the set of rows of network interface parameter values specified in the APN data structure to support network communications by the telematics unit via corresponding communications channels;
    receiving, by the processor from a network access device (NAD) of the vehicular telematics unit, a home public land mobile network (HPLMN) identifier corresponding to a first mobile wireless network service provider (MWNSP);
    identifying, from the set of APN data structures, a non-active APN data structure that contains a PLMN identifier matching the HPLMN identifier of the first MWNSP; and
    designating, after the identifying, the non-active APN data structure as the active APN data structure.

2. The method of claim 1, further comprising:
    receiving, from a service provider server, a target public land mobile network (PLMN) identifier corresponding to a target mobile wireless network service provider (MWNSP); and
    searching for, in a set of access point name (APN) data structures each having a PLMN identifier element, a target APN data structure storing the target PLMN identifier at its PLMN identifier element.

3. The method of claim 2, further comprising:
    if the target APN data structure is found in the searching, issuing a subscription swap readiness verified message for transmission to the service provider server; and
    if the target APN data structure is not found in the searching, creating the target APN data structure storing the first PLMN identifier at a PLMN identifier element and issuing a subscription swap readiness verified message for transmission to the service provider server.

4. The method of claim 1, further comprising:
    receiving, from a service provider server, a request to deactivate a subscription with a second MWNSP and activate a subscription with a target MWNSP; and
    issuing, for transmission to a subscription swap server, a request to deactivate, at a universal integrated circuit card (UICC) of the vehicular telematics unit, the subscription with the second MWNSP and to activate the subscription with the target MWNSP.

5. The method of claim 1, further comprising:
    determining that a network access device (NAD) has reset; and
    transmitting, to the NAD in response to determining that the NAD has reset, a request for a current HPLMN identifier.

6. The method of claim 5, wherein the receiving the first HPLMN identifier is responsive to the transmitting the request for the current HPLMN identifier.

7. The method of claim 2, further comprising verifying that the target PLMN identifier received from the service provider server is the same as the HPLMN identifier received from the NAD.

8. The method of claim 7, further comprising, in response to verifying that the target PLMN identifier received from the service provider server is the same as the HPLMN identifier received from the NAD, transmitting, to the service provider server, an acknowledgement that the subscription with the first mobile wireless network service provider (MWNSP) was swapped for the subscription with the second MWNSP.

9. The method of claim 1, wherein the set of APN data structures is stored at a non-transitory processor readable memory of the telematics unit.

10. The method of claim 1, wherein each APN data structure in the set of APN data structures includes elements for storing one or more wireless network communication parameters.

11. The method of claim 10, wherein the one or more wireless network communication parameters maps one or more services to one or more APNs to be used for packet data connections.

12. The method of claim 3, wherein creating the target APN data structure storing the first PLMN identifier at a PLMN identifier element comprises:
    issuing, for transmission to the service provider server, a request for the target APN data structure;
    receiving, from the service provider server, the target APN data structure; and
    writing the target APN data structure to a non-transitory computer readable medium.

13. The method of claim 3, wherein creating the target APN data structure storing the first PLMN identifier at a PLMN identifier element comprises:
    issuing, for transmission to the service provider server, a request for one or more wireless network communication parameters,
    receiving, from the service provider server, one or more wireless network communication parameters; and
    populating one or more elements of the target APN data structure with the one or more wireless network communication parameters received from the service provider server.

14. The method of claim 1, further comprising:
    receiving, from the NAD, one or more wireless network communication parameters; and
    populating one or more elements of the matching APN data structure with the one or more wireless network communication parameters received from the NAD.

15. A vehicular telematics unit configured to update data structures formatted to store one or more wireless network communication parameters, the telematics unit comprising:
    a processor; and
    a computer-readable medium including computer-executable instructions that, when executed by the processor, cause the telematics unit to perform a method comprising:
        maintaining a set of access point name (APN) data structures, where each one of the set of APN data structures includes a public land mobile network (PLMN) identifier element and a set of rows, each row providing a set of network interface parameter values for a distinct communications channel, and wherein designating one of the set of APN data structures as an active APN data structure causes the telematics unit to reference the set of rows of network interface parameter values specified in the APN data structure to support network communications by the telematics unit via corresponding communications channels;
        receiving a home public land mobile network (HPLMN) identifier corresponding to a first mobile wireless network service provider (MWNSP) from a network access device (NAD) of the vehicular telematics unit;
        identifying, from the set of APN data structures, a non-active APN data structure that contains a PLMN identifier matching the HPLMN identifier of the first MWNSP; and
        designating, after the identifying, the non-active APN data structure as the active APN data structure.

16. The processor of claim 15, further comprising a proofreading engine configured to determine whether the matching APN data structure lacks one or more of unpopulated fields and service-network interface relationship information.

17. The processor of claim 16, wherein the proofreading engine is further configured to determine a data field category to which each unpopulated field belongs and a relationship category to which each service-network interface relationship belongs.

18. The processor of claim 17, further comprising a transmission engine configured to transmit a request for a wireless network communication parameter for an unpopulated field identified by the proofreading engine.

19. The processor of claim 18, wherein the transmission engine is configured to transmit the request to one or more of the NAD, a server of a telematics service provider, and an over-the-air (OTA) server configured to facilitate a MWNSP subscription swap.

20. A method, implemented at a service provider server, for facilitating updating of data structures stored at a non-transitory computer readable medium of a vehicular telematics unit and formatted to store one or more wireless network communication parameters, the method comprising:
    maintaining, for the vehicular telematics unit, a set of access point name (APN) data Structures, where each one of the set of APN data structures includes a public land mobile network (PLMN) identifier element and a set of rows, each row providing a set of network interface parameter values for a distinct communications channel, and wherein designating one of the set of APN data structures as an active APN data structure causes the telematics unit to reference the set of rows of network interface parameter values specified in the APN data structure to support network communications by the telematics unit via corresponding communications channels;
    transmitting, to the vehicular telematics unit:
        a target public land mobile network (PLMN) identifier and a request to verify that an access point name (APN) data structure having a PLMN identifier element storing the target PLMN identifier is stored at a non-transitory computer readable medium of the vehicular telematics unit; and
        a request to deactivate a subscription with a first mobile wireless network service provider (MWNSP) and activate a subscription with a target MWNSP; and
        a request to confirm that an over-the-air (OTA) subscription swap has been completed and to provide a home PLMN (HPLMN) identifier of an APN data structure designated as active after completion of the subscription swap;

wherein the request to deactivate a subscription with the first MWNSP and activate a subscription with a target MWNSP includes a request to perform the OTA subscription swap.

* * * * *